US012298896B2

(12) United States Patent
Kohmoto et al.

(10) Patent No.: US 12,298,896 B2
(45) Date of Patent: May 13, 2025

(54) INFORMATION PROCESSING DEVICE, INFORMATION PROCESSING METHOD, AND NON-TRANSITORY STORAGE MEDIUM

(71) Applicants: TOYOTA JIDOSHA KABUSHIKI KAISHA, Toyota (JP); MITSUBISHI MOTORS CORPORATION, Tokyo (JP); SUBARU CORPORATION, Tokyo (JP); Nissan Motor Co., Ltd., Yokohama (JP); Honda Motor Co., Ltd., Tokyo (JP)

(72) Inventors: Norihide Kohmoto, Nisshin (JP); Shinsuke Sakashita, Hiroshima (JP); Tomoaki Sato, Aki-gun (JP); Yusuke Takada, Hamamatsu (JP)

(73) Assignees: TOYOTA JIDOSHA KABUSHIKI KAISHA, Toyota (JP); MITSUBISHI MOTORS CORPORATION, Tokyo (JP); SUBARU CORPORATION, Tokyo (JP); Nissan Motor Co., Ltd., Yokohama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/326,365

(22) Filed: May 31, 2023

(65) Prior Publication Data

US 2023/0385189 A1    Nov. 30, 2023

(30) Foreign Application Priority Data

May 31, 2022    (JP) .................................. 2022-089028

(51) Int. Cl.
*G06F 12/02*    (2006.01)
(52) U.S. Cl.
CPC ................................. *G06F 12/023* (2013.01)
(58) Field of Classification Search
CPC ............... G06F 12/023; G06F 12/1441; G06F 12/1483; G06F 12/0284; G06F 2212/1024;
(Continued)

(56) References Cited

U.S. PATENT DOCUMENTS

2009/0193212 A1    7/2009  Kodaka
2019/0232891 A1*   8/2019  Ishigooka ............. G06F 3/0622
(Continued)

FOREIGN PATENT DOCUMENTS

JP    3-271842 A    12/1991
JP    2009-181268 A    8/2009
(Continued)

*Primary Examiner* — Hua J Song
(74) *Attorney, Agent, or Firm* — Oblon, McClelland, Maier & Neustadt, L.L.P.

(57) ABSTRACT

An information processing device includes a processor that manages allocation of a resource in a storage region of a storage to a plurality of functions. The storage is mounted on a vehicle and includes a dedicated region and a shared region. The dedicated region is configured to be allocated the resource configured to be exclusively used by a specific function, among the functions. The shared region is configured to be allocated the resource configured to be shared by the functions. The resource in the shared region is configured to be dynamically allocated.

11 Claims, 14 Drawing Sheets

(58) Field of Classification Search
CPC ............. G06F 2212/173; G06F 3/0604; G06F 3/0616; G06F 3/0631; G06F 3/0644; G06F 9/5011; G06F 9/5022
USPC ........................................................ 711/170
See application file for complete search history.

(56) References Cited

U.S. PATENT DOCUMENTS

| | | |
|---|---|---|
| 2019/0280893 A1 | 9/2019 | Ninagawa |
| 2021/0255803 A1* | 8/2021 | Kanno .................... G06F 3/061 |
| 2022/0100401 A1 | 3/2022 | Tanaka et al. |
| 2023/0185611 A1* | 6/2023 | Vishnuswaroop Ramesh ............. G06F 9/4405 718/104 |

FOREIGN PATENT DOCUMENTS

| | | |
|---|---|---|
| JP | 2015-228194 A | 12/2015 |
| JP | 2019-159661 A | 9/2019 |
| JP | 2022-57224 A | 4/2022 |

\* cited by examiner

INFORMATION PROCESSING DEVICE, INFORMATION PROCESSING METHOD, AND NON-TRANSITORY STORAGE MEDIUM

CROSS-REFERENCE TO RELATED APPLICATION

This application claims priority to Japanese Patent Application No. 2022-089028 filed on May 31, 2022, incorporated herein by reference in its entirety.

BACKGROUND

1. Technical Field

The present disclosure relates to an information processing device, an information processing method, and a non-transitory storage medium.

2. Description of Related Art

Japanese Unexamined Patent Application Publication No. 2019-159661 (JP 2019-159661 A) discloses a vehicle control device that can add a new function to and delete an existing function from a vehicle without updating an electrical control unit (ECU) program.

SUMMARY

The device according to JP 2019-159661 A stores predetermined information in a storage of the vehicle control device provided in an in-vehicle network system. The vehicle executes various functions using a resource in a storage mounted on the vehicle. The various functions include not only functions introduced to the vehicle in advance, but also functions newly added to the vehicle.

Since the resource in the storage described above is limited, the resource may be depleted unless some contrivance is made to use the resource for a plurality of functions. Even if the resource is limited, it is necessary to render the resource available for use at all times for a specific function about travel performance, for example, as real-time processing is required for the characteristics of the vehicle.

Therefore, the present disclosure provides an information processing device, an information processing method, and a non-transitory storage medium that allow effective use of a resource in a storage mounted on a vehicle while taking the characteristics of the vehicle into consideration.

A first aspect of the present disclosure provides an information processing device including a processor. The processor is configured to manage allocation of a resource in a storage region of a storage to a plurality of functions. The storage is mounted on a vehicle. The storage includes a dedicated region and a shared region. The dedicated region is configured to be allocated the resource configured to be exclusively used by a specific function, among the functions. The shared region is configured to be allocated the resource configured to be shared by the functions. The resource in the shared region is configured to be dynamically allocated.

In the information processing device according to the first aspect of the present disclosure, the processor manages allocation of a resource in a storage region of a storage to a plurality of functions, the storage being mounted on a vehicle and including a dedicated region and a shared region. Consequently, the information processing device allows a plurality of functions to share the resource in the shared region, and allows a specific function to exclusively use the resource in the dedicated region. Therefore, it is possible to effectively use the resource in the storage mounted on the vehicle while taking the characteristics of the vehicle into consideration.

In the information processing device according to the first aspect of the present disclosure, the processor may be configured to allocate the resource in the shared region to the functions after providing a time constraint for which the resource is available for use.

In the information processing device according to the first aspect of the present disclosure, the processor may allocate the resource in the shared region to the functions after providing a time constraint. Consequently, the information processing device can suppress a single function continuously occupying the resource in the shared region.

In the information processing device according to the first aspect of the present disclosure, the processor may be configured to release the resource in the shared region allocated to the functions when a time determined by the time constraint has elapsed.

In the information processing device according to the first aspect of the present disclosure, the processor may release the resource in the shared region allocated to the functions when a time determined by the time constraint has elapsed. The released resource is available for use for the other functions. Consequently, the information processing device can allocate the released resource in the shared region to the other functions.

In the information processing device according to the first aspect of the present disclosure, the processor may be configured to temporarily save the resource to be released when the resource in the shared region allocated to the functions is to be released.

In the information processing device according to the first aspect of the present disclosure, the processor may temporarily save the resource to be released when the resource in the shared region allocated to the functions is to be released. Consequently, the information processing device does not release the resource immediately even when the time determined by the time constraint elapses. Therefore, it is possible to suppress execution of the functions being affected immediately after the lapse of the time.

In the information processing device according to the first aspect of the present disclosure, the processor may be configured to make an advance announcement to the functions, or notify the functions, of release of the resource in the shared region allocated to the functions.

In the information processing device according to the first aspect of the present disclosure, the processor may make an advance announcement to the functions, or notifies the functions, of release of the resource in the shared region allocated to the functions. Consequently, the information processing device can inform the functions of release of the resource in the shared region.

In the information processing device according to the first aspect of the present disclosure, the processor may be configured to notify the functions of resource information on the resource in the shared region.

In the information processing device according to the first aspect of the present disclosure, the processor may notify the functions of resource information. Consequently, the information processing device can inform the functions of the resource information.

In the information processing device according to the first aspect of the present disclosure, the processor may be configured to manage an access right from the functions to the storage region.

In the information processing device according to the first aspect of the present disclosure, the processor may manage an access right from the functions to the storage region. Consequently, the information processing device can suppress unauthorized use of the storage region by the functions.

In the information processing device according to the first aspect of the present disclosure, the processor may be configured to set, as the access right, an access priority that determines a degree of priority of access to the storage region for each of the functions.

In the information processing device according to the first aspect of the present disclosure, the processor may set, as the access right, an access priority that determines a degree of priority of access to the storage region for each of the functions. Consequently, when a plurality of functions has made an access request for the same region of the storage region, the information processing device can give an important function priority to access the region.

In the information processing device according to the first aspect of the present disclosure, the processor may be configured to change a proportion of the shared region to the storage region in accordance with an increase and a decrease in the number of the functions.

In the information processing device according to the first aspect of the present disclosure, the processor may change a proportion of the shared region to the storage region in accordance with an increase and a decrease in the number of the functions. Consequently, the information processing device can adjust the amount of resource in the shared region to be allocated to the functions flexibly in accordance with the demand.

In the information processing device according to the first aspect of the present disclosure, the processor may be configured to set an upper limit of use of the storage region for each of the functions. The processor may be configured to limit use of the storage region for a function for which the upper limit of use has been exceeded.

In the information processing device according to the first aspect of the present disclosure, the processor may set an upper limit of use of the storage region for each of the functions, and limit use of the storage region for a function for which the upper limit of use has been exceeded. Consequently, the information processing device can suppress a single function significantly reducing the life of the storage mounted on the vehicle.

In the information processing device according to the first aspect of the present disclosure, the processor may be configured to adjust an amount of the resource to be allocated to the functions in accordance with a life of the storage.

In the information processing device according to the first aspect of the present disclosure, the processor may adjust an amount of the resource to be allocated to the functions in accordance with a life of the storage mounted on the vehicle. Consequently, the information processing device can adjust the amount of resource in the shared region to be allocated to the functions flexibly in accordance with the life of the storage mounted on the vehicle.

A second aspect of the present disclosure provides an information processing method executed by a computer. The process includes managing allocation of a resource in a storage region of a storage to a plurality of functions. The storage is mounted on a vehicle. The storage includes a dedicated region and a shared region. The dedicated region is configured to be allocated the resource configured to be exclusively used by a specific function, among the functions. The shared region is configured to be allocated the resource configured to be shared by the functions. The resource in the shared region is configured to be dynamically allocated.

A third aspect of the present disclosure provides a non-transitory storage medium storing instructions that are executable by one or more processors and that cause the one or more processors to perform the following function. The function includes managing allocation of a resource in a storage region of a storage to a plurality of functions. The storage is mounted on a vehicle. The storage includes a dedicated region and a shared region. The dedicated region is configured to be allocated the resource configured to be exclusively used by a specific function, among the functions. The shared region is configured to be allocated the resource configured to be shared by the functions. The resource in the shared region is configured to be dynamically allocated.

The information processing device according to other aspects may be configured as follows. In the information processing device according to another aspect, the processor may be configured to notify the functions of resource information on the resource in the shared region.

In the information processing device according to another aspect, the processor may be configured to manage an access right from the functions to the storage region.

In the information processing device according to another aspect, the processor may be configured to change a proportion of the shared region to the storage region in accordance with an increase and a decrease in the number of the functions.

In the information processing device according to another aspect, the processor may be configured to set an upper limit of use of the storage region for each of the functions, and limit use of the storage region for a function for which the upper limit of use has been exceeded.

In the information processing device according to another aspect, the processor may be configured to adjust an amount of the resource to be allocated to the functions in accordance with a life of the storage.

With the information processing device, the information processing method, and the non-transitory storage medium according to the present disclosure, as described above, it is possible to effectively use the resource in the storage mounted on the vehicle while taking the characteristics of the vehicle into consideration.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle 10 according to the present embodiment will be described below with reference to the drawings.

Figure 1:
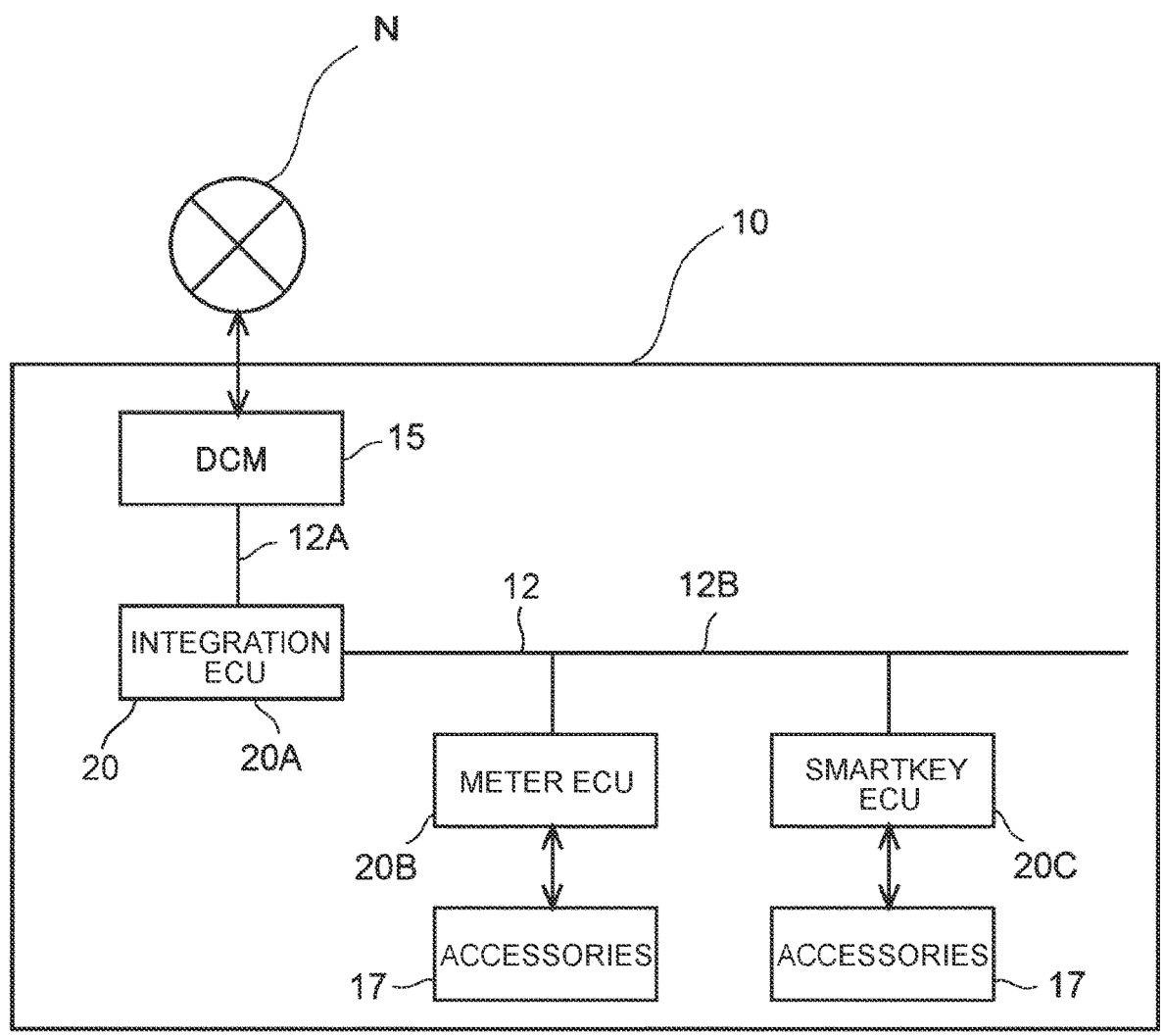
FIG. 1 is a block diagram illustrating a schematic configuration of a vehicle according to the present embodiment.

FIG. 1 is a block diagram illustrating a schematic configuration of the vehicle 10 according to the present embodiment.

As illustrated in FIG. 1, the vehicle 10 includes a plurality of electrical control units (ECUs) 20 and a data communication module (DCM) 15. The vehicle 10 includes at least an integration ECU 20A, a meter ECU 20B, and a smartkey ECU 20C as the ECUs 20.

The ECUs 20 and the DCM 15 are connected to each other via an external bus (communication bus) 12. The external bus 12 includes a first bus 12A that connects between the integration ECU 20A and the DCM 15, and a second bus 12B that connects among the integration ECU 20A, the meter ECU 20B, and the smartkey ECU 20C. Communication through the Ethernet (registered trademark) is performed through the external bus 12. The method of communication through the external bus 12 is not limited to the Ethernet (registered trademark). The method of communication through the external bus 12 may use the Controller Area Network (CAN) protocol, CAN with Flexible Data Rate (CAN-FD), etc. Consequently, the meter ECU 20B and the smartkey ECU 20C can access the integration ECU 20A through service-oriented communication.

The ECUs 20 are connected to accessories 17. The accessories 17 are required to control the vehicle 10, or constitute the vehicle 10. The ECUs 20 connected to the integration ECU 20A via the second bus 12B are not limited to the meter ECU 20B and the smartkey ECU 20C. The ECUs 20 connected to the integration ECU 20A via the second bus 12B may be various ECUs such as a transmission ECU, an engine ECU, a body ECU, and a smartkey ECU.

The DCM 15 is connected to a network N, and enables communication with the outside. A wireless communication standard such as 5G, LTE, and Wi-Fi (registered trademark), for example, may be used for the network N.

Figure 2:
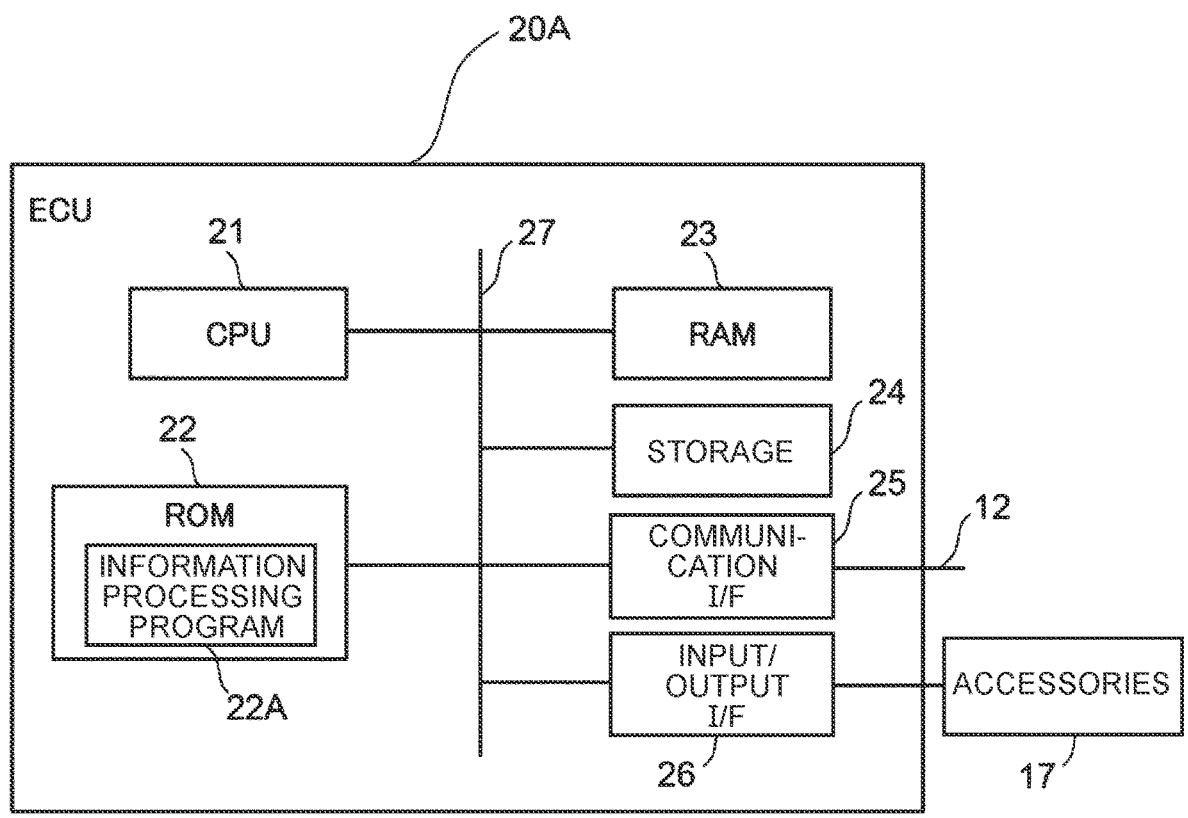
FIG. 2 is a block diagram illustrating a schematic configuration of an integration electrical control unit (ECU) according to the present embodiment.

FIG. 2 is a block diagram illustrating a schematic configuration of the integration ECU 20A according to the present embodiment.

As illustrated in FIG. 2, the integration ECU 20A is configured to include a central processing unit (CPU) 21, a read only memory (ROM) 22, a random access memory (RAM) 23, a storage 24, a communication interface (I/F) 25, and an input/output I/F 26. The CPU 21, the ROM 22, the RAM 23, the storage 24, the communication I/F 25, and the input/output I/F 26 are communicably connected to each other via an internal bus 27.

The CPU 21 is a central processing unit. The CPU 21 executes various programs, and controls various portions. That is, the CPU 21 reads a program from the ROM 22, and executes the program using the RAM 23 as a work area. In the present embodiment, an information processing program 22A is stored in the ROM 22. The CPU 21 is an example of the "information processing device".

The ROM 22 stores various programs and various data. The RAM 23 temporarily stores programs and data as a work area.

The storage 24 is a NAND memory constituted from an embedded Multi Media Card (eMMC), a Universal Flash Storage (UFS), etc. The storage 24 and the CPU 21 are connected through an eMMC or UFS interface. The storage 24 is an example of the "storage mounted on a vehicle".

The storage 24 is a storage that enables writing, reading, and deletion by a plurality of applications inside and outside the vehicle 10. The applications are an example of the "functions". The storage 24 is not limited to being constituted of a single storage device such as an eMMC or a UFS, and may be constituted of a plurality of storage devices such as eMMCs and UFSs.

Components of the integration ECU 20A such as the ROM 22 and the storage 24 are preferably tamper-resistant media such as hardware security modules (HSMs).

The communication I/F 25 is an interface that connects the ECU 20A to the DCM 15 and the different ECUs 20. A communication standard with the Ethernet (registered trademark) is used as the interface. The communication OF 25 is connected to the external bus 12.

The input/output OF 26 is an interface for communication with the accessories 17 mounted on the vehicle 10.

Figure 3:
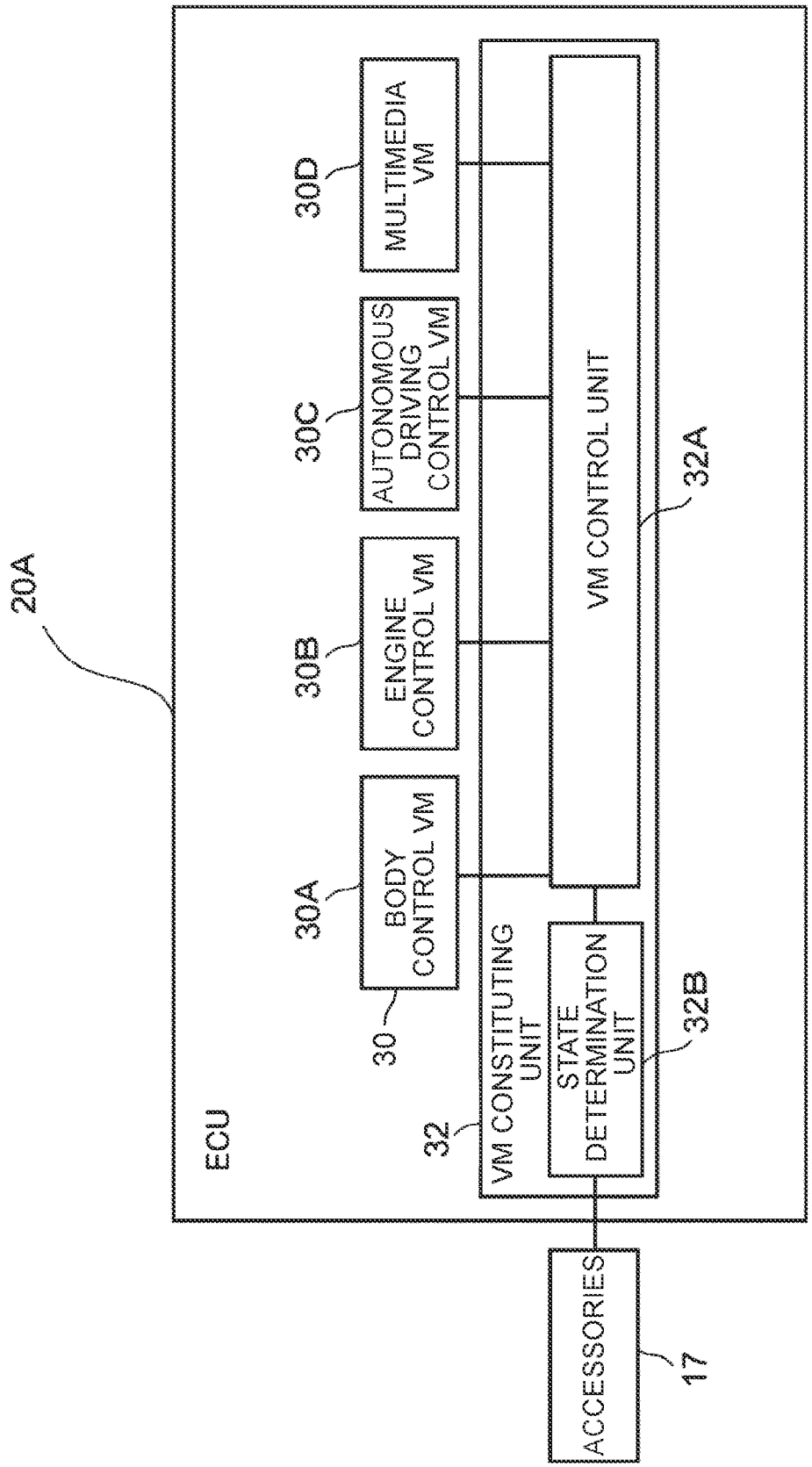
FIG. 3 is a block diagram illustrating an example of the functional components of the integration ECU according to the present embodiment.

FIG. 3 is a block diagram illustrating an example of the functional components of the integration ECU 20A according to the present embodiment. The functional components are implemented by the CPU 21 reading and executing the information processing program 22A stored in the ROM 22.

As illustrated in FIG. 3, the integration ECU 20A includes four virtual machines (VMs) 30 and a VM constituting unit 32. The VMs 30 include a body control VM an engine control VM 30B, an autonomous driving control VM 30C, and a multimedia VM 30D. The VMs 30 implemented in the integration ECU 20A are not limited thereto, and the integration ECU 20A may further include VMs 30 for various usage.

The VM constituting unit 32 has a function of virtually constituting the VMs 30. The VM constituting unit 32 is implemented by the function of a so-called hypervisor. The VM constituting unit 32 further includes a VM control unit 32A and a state determination unit 32B.

The VM control unit 32A has a function of controlling the order of activation and deactivation of the VMs 30 and the allocation of resource of the CPU 21.

The state determination unit 32B has a function of determining the state of the vehicle 10 based on information on the accessories 17. The state of the vehicle 10 includes the occupancy state, the travel state, the drive state, etc. The occupancy state includes "occupied" and "vacant" states determined based on information from an in-vehicle camera, a seating sensor, etc. included in the accessories 17. The travel state includes "traveling" and "parked" states determined based on information from a vehicle speed sensor etc. included in the accessories 17. The drive state includes "autonomous driving" and "manual driving" states determined based on information from a steering angle sensor, a throttle position sensor, etc. included in the accessories 17. The VM control unit 32A controls activation and deactivation of the VMs 30 in accordance with the state of the vehicle 10 determined by the state determination unit 32B.

Figure 4:
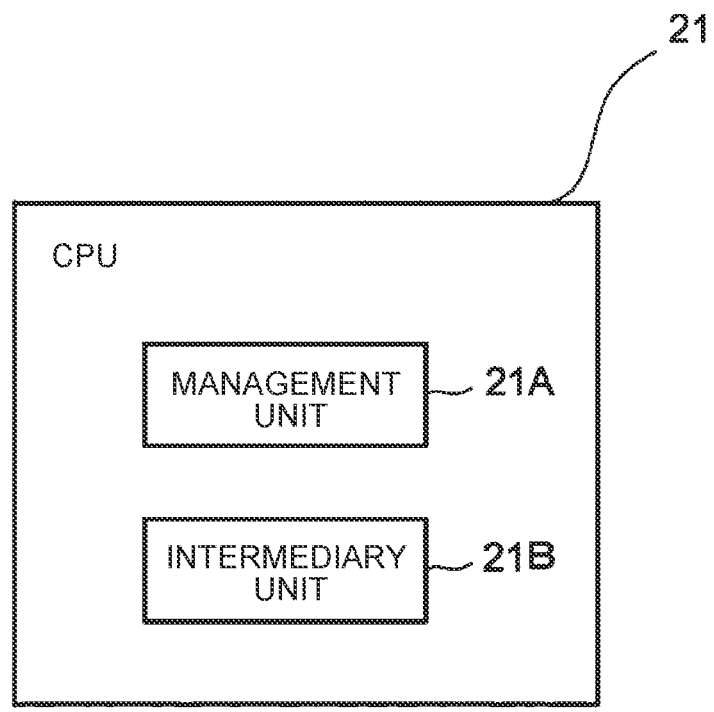
FIG. 4 is a block diagram illustrating an example of the functional components of a central processing unit (CPU) of the integration ECU according to the present embodiment.

FIG. 4 is a block diagram illustrating an example of the functional components of the CPU 21 of the integration ECU 20A according to the present embodiment. As illustrated in FIG. 4, the CPU 21 functions as a management unit 21A and an intermediary unit 21B. The functional components are implemented by the CPU 21 reading and executing the information processing program 22A stored in the ROM 22.

The management unit 21A performs storage resource allocation management, storage resource release management, storage resource information management, storage 24 life management, storage 24 operation management, and storage 24 access management. The storage resource includes the capacity and the upper limit number of times of rewriting of the storage 24, by way of example. The storage resource is an example of the "resource".

In the storage resource allocation management, the management unit 21A manages allocation of the storage resource to a plurality of applications that can access the storage region of the storage 24 mounted on the vehicle 10. Specifically, the management unit 21A allocates, as the storage resource, a part of the capacity of the storage region of the storage 24 and the upper limit number of times of rewriting of the storage 24 to the applications.

In the storage resource release management, the management unit 21A manages release of the storage resource in which the allocated storage resource is rendered available for use by other applications. Specifically, the management unit 21A renders a region of the storage 24 available for use for a different application by deleting a directory, to be discussed later, secured as the storage resource in the storage region of the storage 24.

In the storage resource information management, the management unit 21A manages resource information about the storage resource. In the storage resource information management, in addition, the management unit 21A sends various notifications to the applications based on acquired resource information. The resource information is configured to include data file information, resource capacity information, and resource attribute information, by way of example. The data file information includes a file name that indicates the name of a data file in the storage resource, the capacity of the data file, the access right to the data file, etc. The resource capacity information includes the total capacity of the storage 24, the capacity of a used region (hereinafter referred to as a "used capacity"), the capacity of an unused region (hereinafter referred to as an "unused capacity"), etc. The resource attribute information includes a storage resource name that indicates the name of a storage resource, an access path for accessing the storage resource, the access right to the storage resource, the upper limit number of times of rewriting of the storage 24, the date and time when the storage resource is secured, the release time limit of the storage resource, etc. The resource information is an example of the "resource information".

In the storage 24 life management, the management unit 21A manages the life of the storage 24 which is determined based on the upper limit number of times of rewriting of the storage 24, and the life for each application. By way of example, the management unit 21A measures the number of times of rewriting of the storage 24 for each application, and manages the proportion of the number of times of rewriting to the upper limit number of times of rewriting allocated as the storage resource.

In the storage 24 operation management, the management unit 21A manages an operation on a data file in the storage 24 based on an operation request for the data file in the storage 24 received from the applications. Specifically, the management unit 21A writes into a data file, reads a data file, and deletes a data file as an operation on a data file in the storage 24. The management unit 21A can receive the operation request described above from the other ECUs 20 (see FIG. 1) that can perform service-oriented communication with the integration ECU 20A, the VMs 30 (see FIG. 3) implemented by the function of the VM constituting unit 32 in the integration ECU 20A, etc.

In the storage 24 access management, the management unit 21A manages the access right from the applications to the storage 24. Specifically, the management unit 21A determines whether to receive various requests from the applications based on the access right. In the access management, in addition, the management unit 21A sets an access priority to each of the applications. The access priority is the priority degree of access to the storage region of the storage 24 as the access right. In the present embodiment, three levels of access priority, namely "low", "middle", and "high", are provided. "Middle" is higher in priority degree than "low". "High" is higher in priority degree than "middle". When a plurality of applications has made an access request for the same region of the storage region of the storage 24, the management unit 21A gives priority to access the region, to an application with higher access priority.

The management performed by the management unit 21A described above will be discussed in detail later.

The intermediary unit 21B mediates processes between the applications and the management unit 21A and between the management unit 21A and the storage 24. By way of example, the intermediary unit 21B is implemented as a function of an operating system (OS) of the CPU 21. In addition, the intermediary unit 21B is informed of the state of the storage 24 and resource information.

Figure 5:
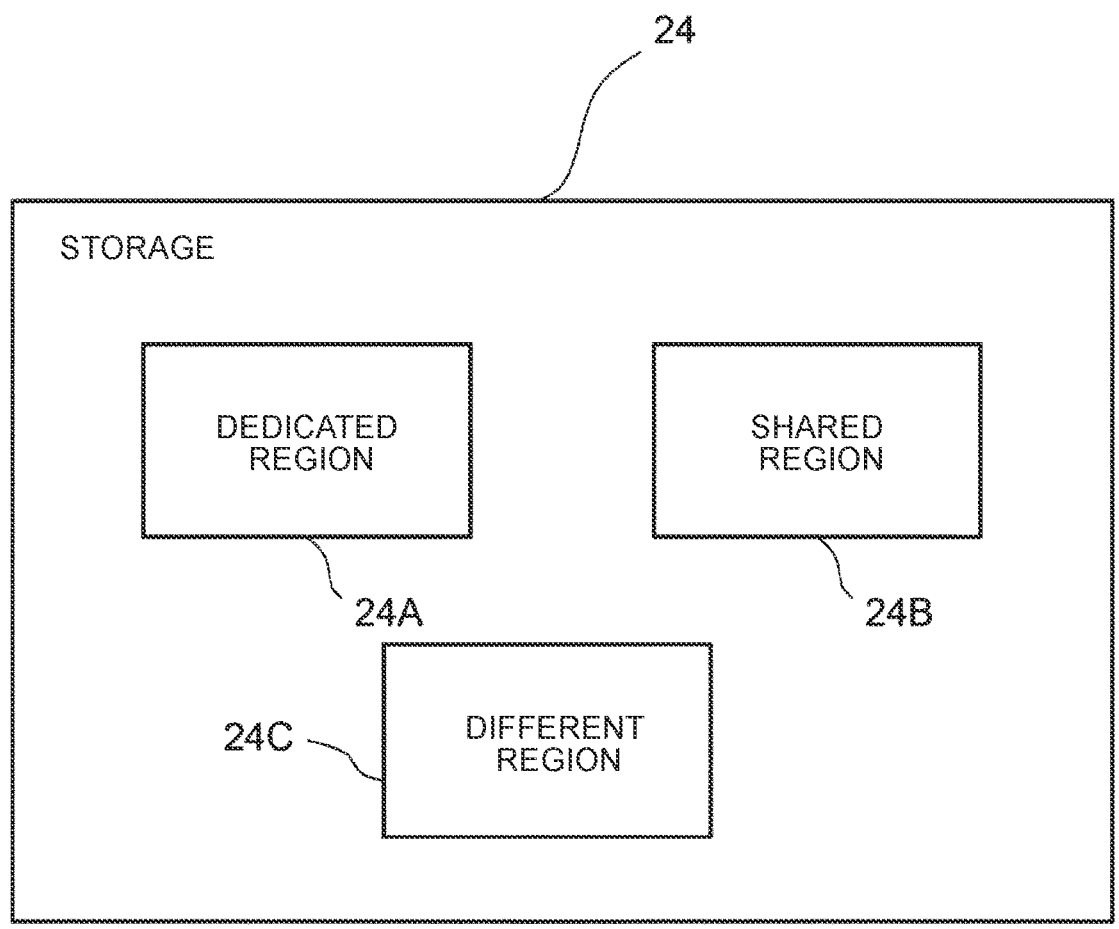
FIG. 5 is a block diagram illustrating the configuration of a storage of the integration ECU according to the present embodiment.

FIG. 5 is a block diagram illustrating the configuration of the storage 24 of the integration ECU 20A according to the present embodiment.

The storage 24 at least has a function of logically dividing the storage region of the storage 24. Consequently, the storage region of the storage 24 is logically divided into three regions, namely a dedicated region 24A, a shared region 24B, and a different region 24C, as illustrated in FIG. 5, by way of example.

The dedicated region 24A is a region to which a storage resource that is exclusively available for use for a specific application, among the applications, is allocated. By way of example, the storage resource in the dedicated region 24A is allocated to an application bundled with the vehicle 10 at the time of factory shipping. The application bundled with the vehicle 10 at the time of factory shipping is an example of the specific application. In FIG. 5, only the dedicated region 24A is illustrated as the dedicated region. However, the storage 24 may be provided with dedicated regions that are exclusively available for use for respective applications bundled with the vehicle 10 at the time of factory shipping.

The shared region 24B is a region which can be shared by a plurality of applications and the storage resource in which can be dynamically allocated. By way of example, the storage resource in the shared region 24B is allocated to applications bundled with the vehicle 10 at the time of factory shipping and applications installed in the vehicle after factory shipping.

The different region 24C is a region of the storage region of the storage 24, other than the dedicated region 24A and the shared region 24B.

The dedicated region 24A and the shared region 24B are different from each other in the following respect.

The dedicated region 24A is a region in which a storage resource determined in advance is statically allocated and in which a storage resource is not dynamically allocated. On the contrary, the shared region 24B is a region in which a storage resource can be dynamically allocated.

In the dedicated region 24A, the allocated storage resource may be used permanently. In the shared region 24B, on the contrary, a time constraint is provided on the time for which the allocated storage resource can be used. The time constraint is defined as a required time (e.g. XX hours) before release of the storage resource.

The dedicated region 24A can be accessed from only a single application to which the storage resource is allocated. On the contrary, the shared region 24B can be accessed from a plurality of applications to which the storage resource is allocated.

Next, an example of the flow of the storage resource allocation management for the shared region 24B by the management unit 21A will be described with reference to the sequence diagrams in FIGS. 6 and 7. In the following description of the sequence diagrams, a desired application among the applications described above is referred to as an "app AP".

Figure 6:
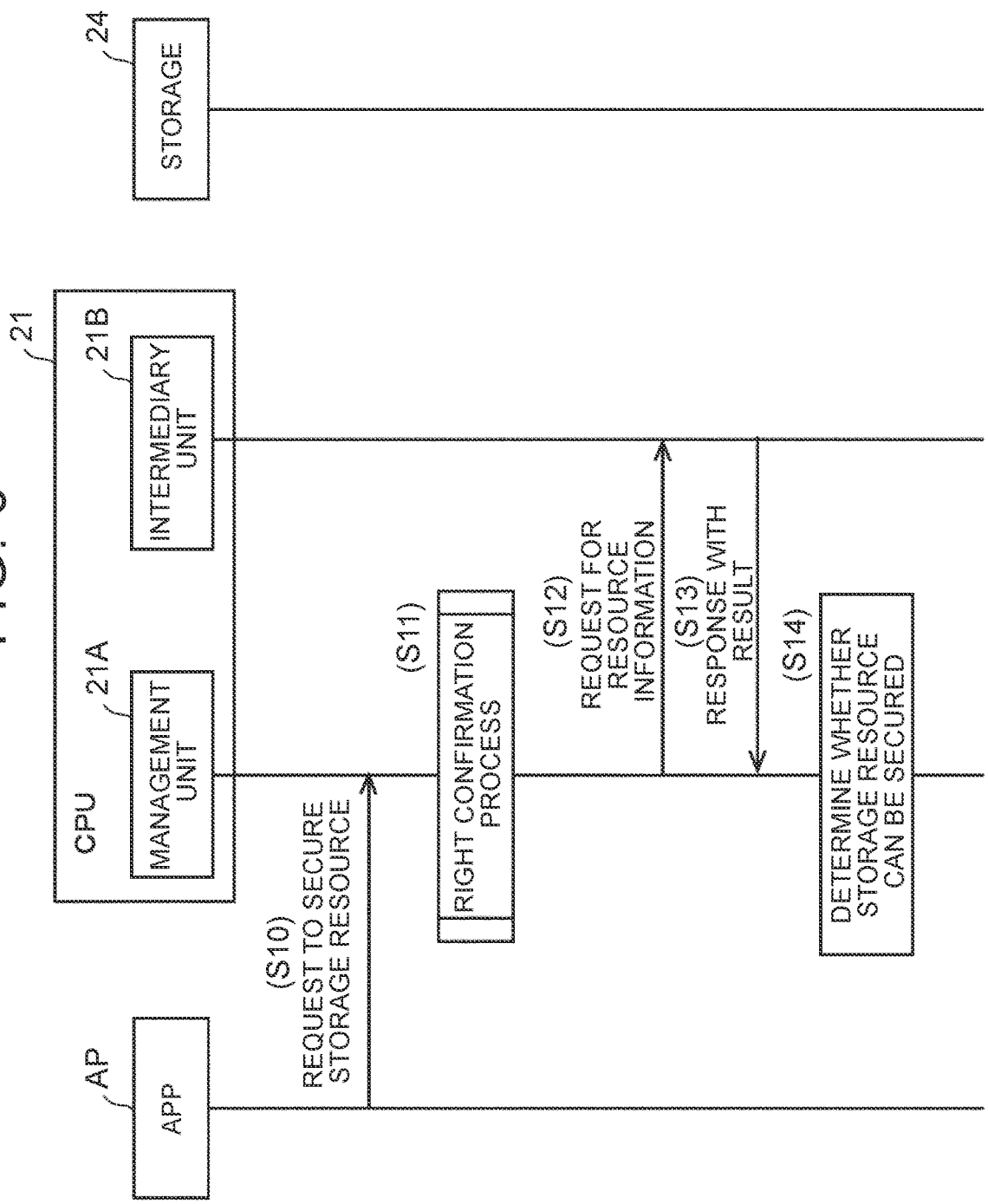
FIG. 6 is a first sequence diagram illustrating an example of the flow of storage resource allocation management according to the present embodiment.

FIG. 6 is a first sequence diagram illustrating an example of the flow of storage resource allocation management.

In step S10 in FIG. 6, the CPU 21 acquires a request to secure a storage resource from the app AP, as the function of the management unit 21A. By way of example, the secure request includes a capacity (hereinafter referred to as a "requested capacity") requested for the shared region 24B, a required time (hereinafter referred to as a "release time limit") before release of the storage resource, and an application identifier for identifying the app AP.

In step S11, the CPU 21 executes a right confirmation process, as the function of the management unit 21A. The right confirmation process will be discussed in detail later.

In step S12, the CPU 21 requests resource information from the intermediary unit 21B, as the function of the management unit 21A.

In step S13, the CPU 21 transmits resource information to the management unit 21A, as the function of the intermediary unit 21B. When it is determined to be necessary to make a notification based on the resource information acquired in step S13, the CPU 21 notifies the app AP by performing storage resource information management. This will be discussed in detail later.

In step S14, the CPU 21 determines whether it is possible to secure a storage resource that is available for use for the app AP which transmitted the secure request, as the function of the management unit 21A. When the unused capacity of the shared region 24B included in the resource information acquired in step S13 is more than the requested capacity included in the secure request acquired in step S10, the CPU 21 determines that it is possible to secure a storage resource that is available for use for the app AP which transmitted the secure request. When the unused capacity of the shared region 24B is less than the requested capacity included in the secure request, on the other hand, the CPU 21 determines that it is not possible to secure a storage resource that is available for use for the app AP which transmitted the secure request.

Figure 7:
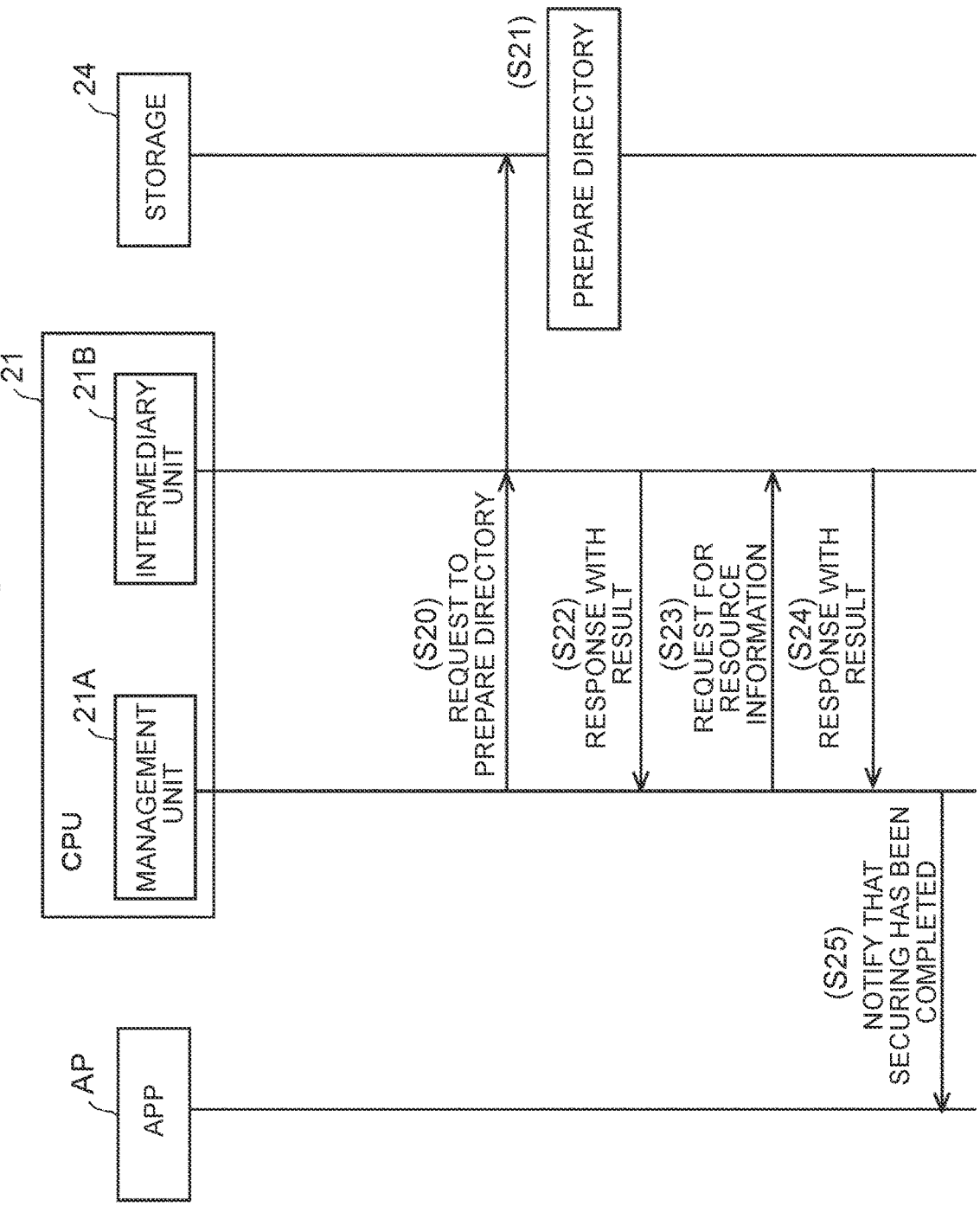
FIG. 7 is a second sequence diagram illustrating an example of the flow of storage resource allocation management according to the present embodiment.

FIG. 7 is a second sequence diagram illustrating an example of the flow of storage resource allocation management. By way of example, FIG. 7 is a sequence diagram for a case where the CPU 21 determines in step S14 illustrated in FIG. 6 that it is possible to secure a storage resource in the shared region 24B that is available for use for the app AP.

In step S20 in FIG. 7, the CPU 21 requests the storage 24 to prepare a directory for the shared region 24B, as the function of the management unit 21A. The directory is a part of the region of the shared region 24B in which a storage resource that is available for use for the app AP is secured. The request to prepare a directory is transmitted to the storage 24 via the intermediary unit 21B.

In step S21, a directory is prepared in the shared region 24B of the storage 24. In this case, the CPU 21 adds resource information to the directory prepared in the shared region 24B, as the function of the intermediary unit 21B. The resource information added to the directory includes a storage resource name, a storage resource attribute, the capacity (hereinafter referred to as a "secured capacity") of the secured shared region 24B, the upper limit number of times of rewriting of the secured shared region 24B, the identifier of an application that can access the storage resource, the date and time when the storage resource is secured, and the release time limit of the storage resource, by way of example.

In step S22, the CPU 21 transmits an indication that a directory has been prepared in the shared region 24B to the management unit 21A, as the function of the intermediary unit 21B.

In step S23, the CPU 21 requests resource information from the intermediary unit 21B, as the function of the management unit 21A.

In step S24, the CPU 21 transmits resource information to the management unit 21A, as the function of the intermediary unit 21B. When it is determined to be necessary to make a notification based on the resource information acquired in step S24, the CPU 21 notifies the app AP by performing storage resource information management. This will be discussed in detail later.

In step S25, the CPU 21 notifies the app AP that securing of the storage resource has been completed, as the function of the management unit 21A. This notification includes the storage resource name of the secured storage resource, the access path to the storage resource, the secured capacity, and the upper limit number of times of rewriting. When the notification is received, the app AP is able to use the secured storage resource. By way of example, the app AP can access the secured storage resource using the storage resource name and the access path included in the notification.

The following notification is made for the app AP when the CPU 21 determines in step S14 illustrated in FIG. 6 that a storage resource in the shared region 24B that is available for use for the app AP cannot be secured, although not illustrated. In this case, the CPU 21 notifies the app AP that a storage resource cannot be secured since the unused capacity of the shared region 24B is less than the requested capacity, as the function of the management unit 21A.

Next, an example of the flow of storage resource release management by the management unit 21A will be described with reference to the sequence diagram in FIG. 8.

Figure 8:
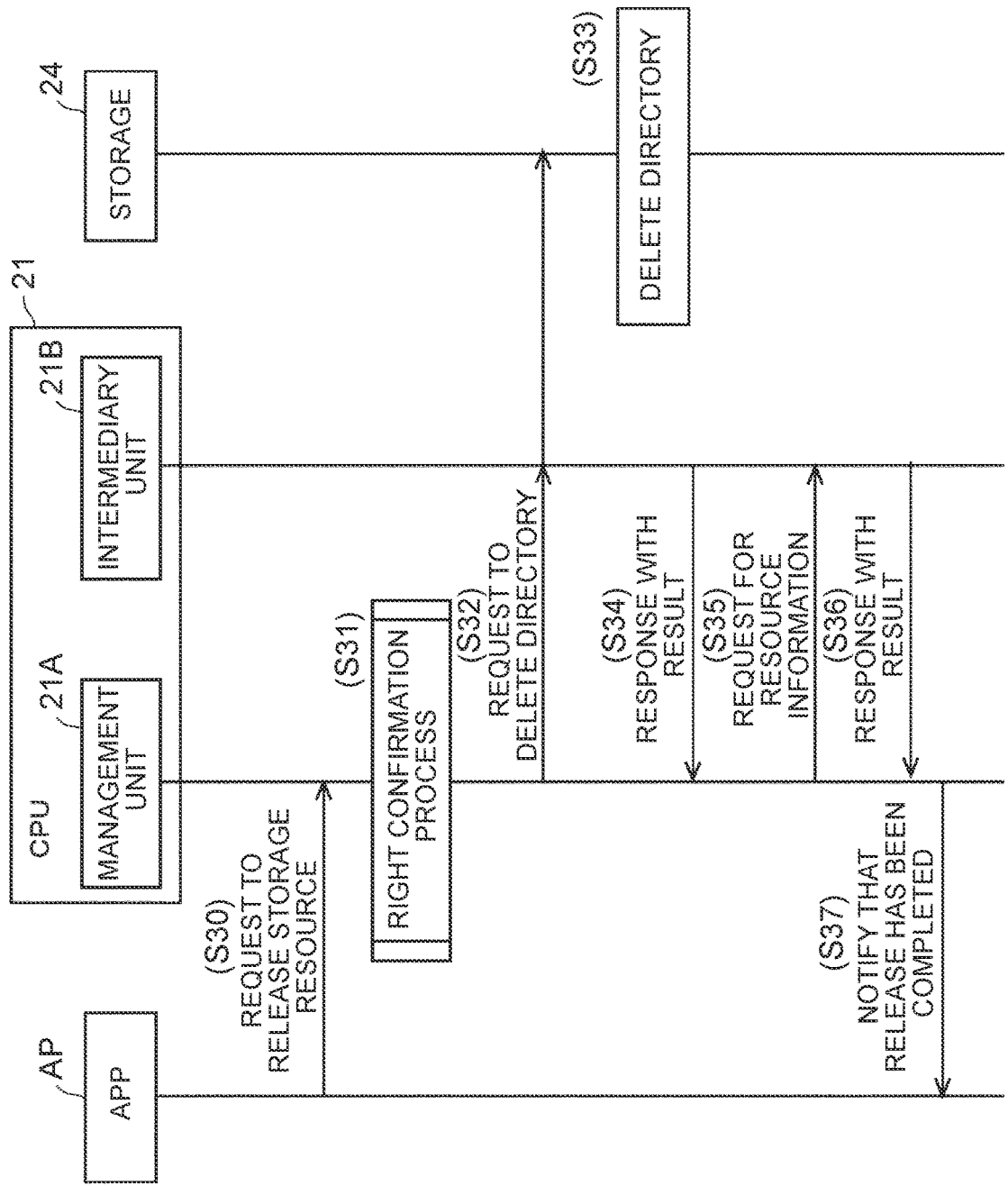
FIG. 8 is a sequence diagram illustrating an example of the flow of storage resource release management according to the present embodiment.

FIG. 8 is a sequence diagram illustrating an example of the flow of storage resource release management. In the storage resource release management, the management unit 21A deletes a directory prepared in the shared region 24B to render the deleted region available for use for a different application. When a directory is deleted, a data file in the directory and resource information corresponding to the directory are also deleted.

In step S30 in FIG. 8, the CPU 21 acquires a request to release the storage resource from the app AP, as the function of the management unit 21A. By way of example, the request to release the storage resource includes a storage resource name and an access path corresponding to the storage resource that is requested to be released.

In step S31, the CPU 21 executes a right confirmation process, as the function of the management unit 21A.

In step S32, the CPU 21 requests the storage 24 to delete a predetermined directory secured as the storage resource in the shared region 24B, as the function of the management unit 21A. The request to delete a directory is transmitted to the storage 24 via the intermediary unit 21B.

In step S33, the directory secured as the storage resource in the shared region 24B for the app AP which transmitted the release request is deleted from the shared region 24B of the storage 24. Consequently, the data file in the directory is also deleted, which increases the unused capacity of the shared region 24B.

In step S34, the CPU 21 transmits an indication that the directory has been deleted from the shared region 24B to the management unit 21A, as the function of the intermediary unit 21B.

In step S35, the CPU 21 requests resource information from the intermediary unit 21B, as the function of the management unit 21A.

In step S36, the CPU 21 transmits resource information to the management unit 21A, as the function of the intermediary unit 21B. When it is determined to be necessary to make a notification based on the resource information acquired in step S36, the CPU 21 notifies the app AP by performing storage resource information management. This will be discussed in detail later.

In step S37, the CPU 21 notifies the app AP that release of the storage resource has been completed, as the function of the management unit 21A.

The storage resource release management is occasionally performed autonomously by the management unit 21A, rather than being performed using the release request from the app AP as a trigger, although not illustrated. A case where the management unit 21A autonomously performs the storage resource release management will be described below.

The management unit 21A deletes the directory secured as the storage resource in the shared region 24B for the app AP when the release time limit of the storage resource for the app AP arrives. In this case, the management unit 21A temporarily saves the directory before deleting the directory. The management unit 21A saves the directory by changing the storage resource attribute of the resource information added to the directory to a predetermined save attribute.

The management unit 21A partially limits a process from the app AP for the directory with the storage resource attribute changed to the save attribute. Specifically, the management unit 21A prohibits a writing process from the app AP, and permits only a reading process and a deletion process, for the directory with the storage resource attribute changed to the save attribute. Then, the management unit 21A deletes the directory from the shared region 24B after a certain time elapses since the storage resource attribute of the directory is changed to the save attribute. When the storage resource attribute of the directory has been changed to the save attribute, and when the directory has been deleted from the shared region 24B, the management unit 21A notifies the app AP of these.

Next, an example of the flow of storage resource information management by the management unit 21A will be described with reference to the sequence diagram in FIG. 9.

Figure 9:
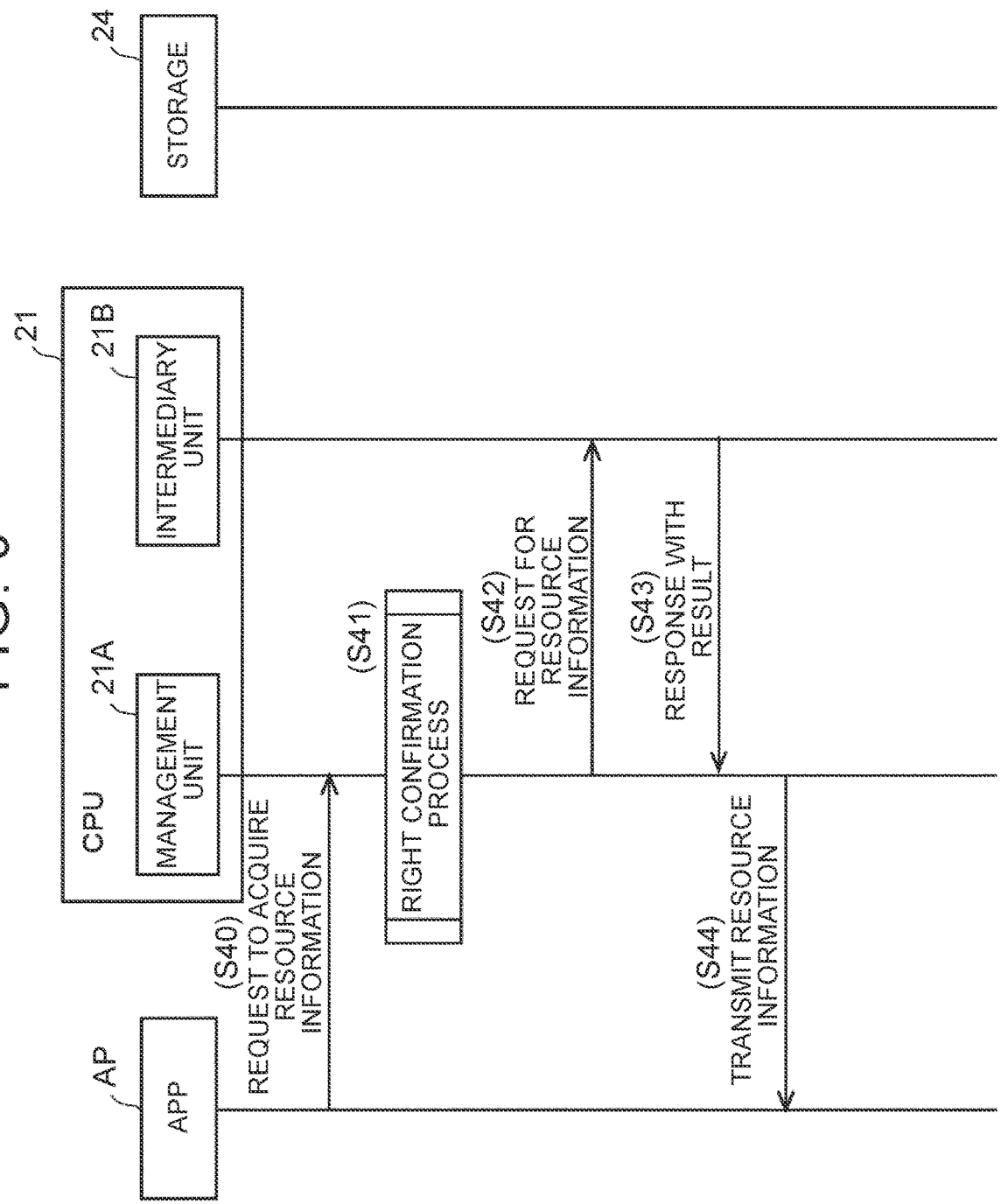
FIG. 9 is a sequence diagram illustrating an example of the flow of storage resource information management according to the present embodiment.

FIG. 9 is a sequence diagram illustrating an example of the flow of storage resource information management.

In step S40 in FIG. 9, the CPU 21 acquires a request to acquire resource information from the app AP, as the function of the management unit 21A. By way of example, the request to acquire resource information includes a storage resource name of the storage resource from which information is to be acquired, and an access path to the storage resource. The storage region of the storage 24 from which resource information can be acquired is not limited. Resource information can be acquired from any of the dedicated region 24A, the shared region 24B, and the different region 24C.

In step S41, the CPU 21 executes a right confirmation process, as the function of the management unit 21A.

In step S42, the CPU 21 requests the intermediary unit 21B for resource information from the storage region of the storage 24 corresponding to the acquisition request acquired in step S40, as the function of the management unit 21A.

In step S43, the CPU 21 transmits resource information to the management unit 21A, as the function of the intermediary unit 21B.

In step S44, the CPU 21 transmits resource information to the app AP, as the function of the management unit 21A.

The storage resource information management is occasionally performed autonomously by the management unit 21A, rather than being performed using the acquisition request from the app AP as a trigger, although not illustrated. A case where the management unit 21A autonomously performs storage resource information management will be described below.

By way of example, when an ignition switch included in the accessories 17 is switched from the OFF position to the ON position, the management unit 21A requests resource information from the intermediary unit 21B during storage resource allocation management (step S13 illustrated in FIG. 6 and step S24 illustrated in FIG. 7) and storage resource release management (step S36 illustrated in FIG. 8). Then, the management unit 21A notifies the app AP when it is determined to be necessary to make a notification based on the acquired resource information in the above case. In the present embodiment, by way of example, the management unit 21A autonomously notifies the app AP in the following four cases.

When the release time limit of the storage resource for the app AP draws near, the management unit 21A notifies the app AP of the remaining time until the release time limit in a stepped manner. The management unit 21A acquires the time for which the ignition switch is at the ON position and the time since the ignition switch is switched from the ON position to the OFF position until the ignition switch is next switched from the OFF position to the ON position, and manages the time obtained by subtracting the sum of the two time values from the value of the release time limit as the remaining time until the release time limit.

In the present embodiment, by way of example, the management unit 21A notifies the app AP as described above a plurality of times. Specifically, the management unit 21A makes a first notification X hours before the release time limit (X is a natural number of one or more). The management unit 21A makes a second notification (X−12) hours before the release time limit. The management unit 21A makes a third notification (X−18) hours before the release time limit.

The management unit 21A immediately notifies the app AP if the ignition switch is at the ON position when the timing for the above notification arrives. If the ignition switch is at the OFF position when the timing for the above notification arrives, the management unit 21A notifies the app AP when the ignition switch is next switched from the OFF position to the ON state. The same applies to the following notifications.

The management unit 21A notifies the app AP that the release time limit of the allocated storage resource has been exceeded when the release time limit of the storage resource for the app AP has been exceeded. Then, the management unit 21A performs the storage resource release management, and deletes the directory secured as the storage resource in the shared region 24B for the app AP.

The management unit 21A notifies the app AP of the unused capacity of the allocated storage resource when the proportion of the used capacity to the requested capacity for the app AP is a proportion determined in advance or more. In the present embodiment, by way of example, the management unit 21A notifies the app AP a plurality of times. Specifically, the management unit 21A makes a first notification when the proportion of the used capacity to the requested capacity for the app AP is X % or more. The management unit 21A makes a second notification when the proportion of the used capacity to the requested capacity for the app AP is (X+10)% or more. The management unit 21A makes a third notification when the proportion of the used capacity to the requested capacity for the app AP is (X+15)% or more.

The management unit 21A notifies the app AP that the secured capacity of the allocated storage resource has been exceeded when the used capacity of the storage resource for the app AP has exceeded the secured capacity. At this time, the management unit 21A cancels the writing process being performed when the secured capacity is exceeded, and deletes the data file being written. In addition, the management unit 21A prohibits a writing process for the storage resource from the app AP until a condition determined in advance is met after the management unit 21A transmits the notification to the app AP. Then, the management unit 21A also notifies the app AP that a writing process has been prohibited. Further, the management unit 21A requests the app AP to delete a data file in the storage resource until a condition determined in advance is met. In the present embodiment, by way of example, the condition determined in advance is met when the unused capacity of the storage resource exceeds a certain capacity.

The app AP may execute various processes based on acquiring various notifications from the CPU 21. For example, the app AP may start processes that match the content of notifications based on acquiring various notifications from the CPU 21. The app AP may cause a terminal of the user who is the user of the application AP to notify the content of the notification, and cause the user to understand the content of the notification.

Next, an example of the flow of storage 24 life management by the management unit 21A will be described with reference to the sequence diagram in FIG. 10.

Figure 10:
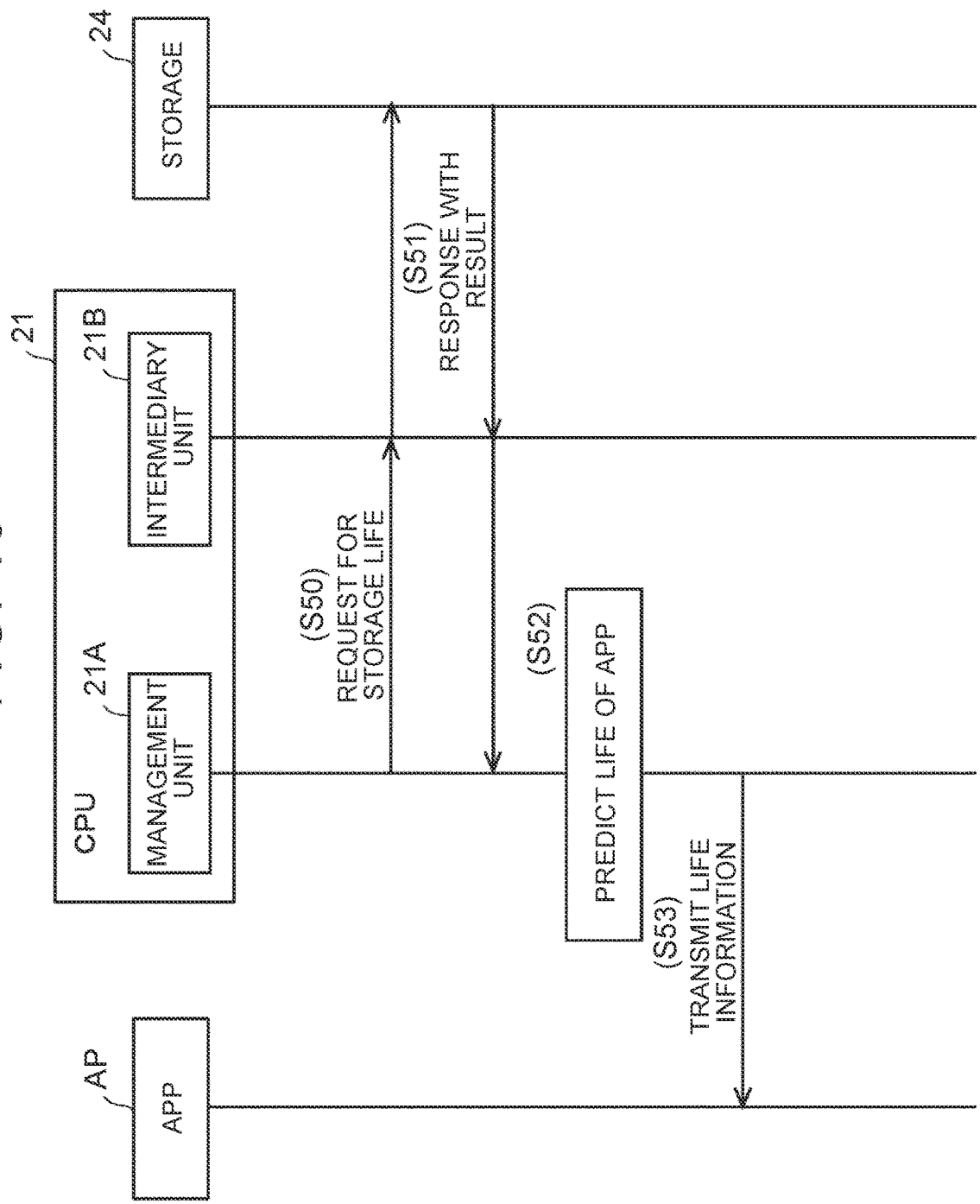
FIG. 10 is a sequence diagram illustrating an example of the flow of storage life management according to the present embodiment.

FIG. 10 is a sequence diagram illustrating an example of the flow of storage 24 life management. By way of example, the management unit 21A performs storage 24 life management when the ignition switch is switched from the OFF position to the ON position.

In step S50 in FIG. 10, the CPU 21 requests the storage 24 for the life of the storage 24, as the function of the management unit 21A. The request for the life (the information on the life) of the storage 24 is transmitted to the storage 24 by way of the intermediary unit 21B. The request for the life of the storage 24 includes information that indicates the target storage device and the cell attribute of the storage device.

In step S51, the CPU 21 acquires the life of the storage 24 from the storage 24, as the function of the management unit 21A. The life of the storage 24 is transmitted to the management unit 21A by way of the intermediary unit 21B. In the present embodiment, the number of times of rewriting and the upper limit number of times of rewriting for each cell attribute are acquired as the life of the storage 24.

In step S52, the CPU 21 predicts the life of the app AP, as the function of the management unit 21A. By way of example, the management unit 21A predicts what period of use the allocated storage resource will be depleted in as the life of the app AP based on the life of the storage 24 acquired in step S51, the secured capacity and the used capacity of the storage resource for the app AP, etc.

In step S53, the CPU 21 transmits life information to the app AP, as the function of the management unit 21A. The life information includes the following information under a specific condition, besides the life of the storage 24 acquired in step S51 and the life of the app AP predicted in step S52.

By way of example, the management unit 21A notifies the app AP of the number of times of rewriting as the life information when the proportion of the number of times of rewriting to the upper limit number of times of rewriting of the app AP is a proportion determined in advance or more. In this case, the management unit 21A notifies the app AP a plurality of times. Specifically, the management unit 21A makes a first notification when the proportion of the number of times of rewriting to the upper limit number of times of rewriting of the app AP is X % or more. The management unit 21A makes a second notification when the proportion of the number of times of rewriting to the upper limit number of times of rewriting of the app AP is (X+10)% or more. The management unit 21A makes a third notification when the proportion of the number of times of rewriting to the upper limit number of times of rewriting of the app AP is (X+15)% or more.

In addition, the management unit 21A notifies the app AP that the upper limit number of times of rewriting has been exceeded as the life information when the number of times of rewriting of the app AP has exceeded the upper limit number of times of rewriting. At this time, the management unit 21A cancels the writing process being performed when the upper limit number of times of rewriting is exceeded, and deletes the data file being written. In addition, the management unit 21A prohibits a writing process for the storage resource from the app AP after the management unit 21A transmits the notification to the app AP. Then, the management unit 21A also notifies the app AP that a writing process has been prohibited.

Next, an example of the flow of storage 24 operation management by the management unit 21A will be described with reference to the sequence diagram in FIG. 11.

Figure 11:
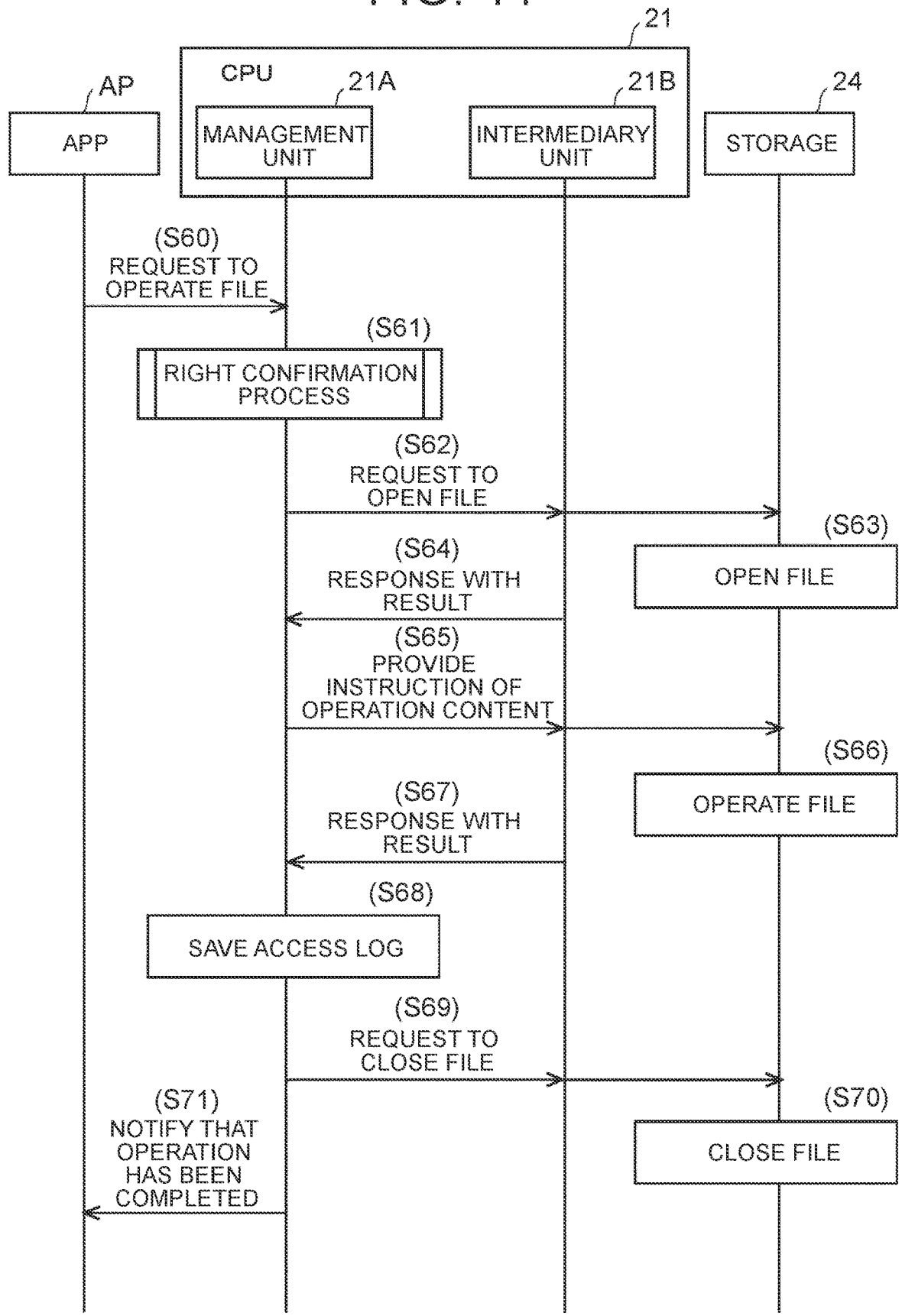
FIG. 11 is a sequence diagram illustrating an example of the flow of storage operation management according to the present embodiment.

FIG. 11 is a sequence diagram illustrating an example of the flow of storage 24 operation management.

In step S60 in FIG. 11, the CPU 21 acquires a request to operate a data file in the directory secured as the storage resource in the storage 24 for the app AP, as the function of the management unit 21A. By way of example, the request to operate a data file includes information that specifies a data file requested to be operated and the content of the operation on the data file.

In step S61, the CPU 21 executes a right confirmation process, as the function of the management unit 21A.

In step S62, the CPU 21 requests the storage 24 to open a data file corresponding to the operation request acquired in step S60, as the function of the management unit 21A. The request to open a data file is transmitted to the storage 24 via the intermediary unit 21B.

In step S63, the data file requested in step S62 is opened in the storage 24.

In step S64, the CPU 21 transmits an indication that the requested data file has been opened in the storage 24 to the management unit 21A, as the function of the intermediary unit 21B.

In step S65, the CPU 21 provides an instruction of the content of an operation on a data file corresponding to the operation request acquired in step S60 to the storage 24, as the function of the management unit 21A. The content of an operation on a data file is transmitted to the storage 24 by way of the intermediary unit 21B.

In step S66, the data file opened in step S63 is operated with the content of the operation transmitted in step S65. Specifically, data are written into the data file, data are read from the data file, or the data file is deleted in step S66.

In step S67, the CPU 21 transmits an indication that the data file has been operated to the management unit 21A, as the function of the intermediary unit 21B.

In step S68, the CPU 21 saves an access log for the content of the operation performed on the data file, as the function of the management unit 21A. The access log is saved in the different region 24C of the storage 24, by way of example.

In step S69, the CPU 21 requests the storage 24 to close the data file opened in step S63, as the function of the management unit 21A. The request to close the data file is transmitted to the storage 24 by way of the intermediary unit 21B.

In step S70, the data file opened in step S63 is closed.

In step S71, the CPU 21 notifies the app AP that an operation of the data file has been completed, as the function of the management unit 21A. The CPU 21 may execute step S71 after the CPU 21 transmits an indication that the data file has been operated to the management unit 21A, as the function of the intermediary unit 21B.

Next, an example of the flow of the right confirmation process executed by the CPU 21, as the function of the management unit 21A, will be described with reference to the flowchart in FIG. 12.

Figure 12:
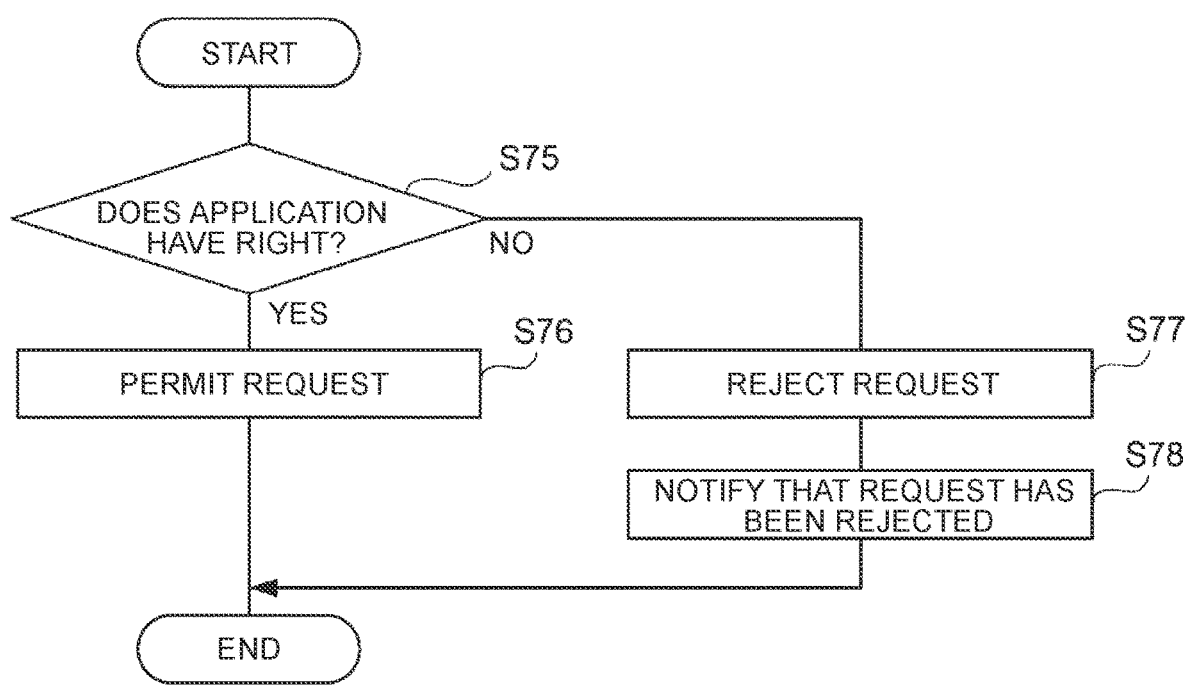
FIG. 12 is a flowchart illustrating an example of the flow of a right confirmation process according to the present embodiment.

FIG. 12 is a flowchart illustrating an example of the flow of the right confirmation process. In step S75 in FIG. 12, the CPU 21 determines whether an application that has transmitted a request has a right for the storage 24. When the CPU 21 determines that the application has a right (step S75: YES), the process proceeds to step S76. When the CPU 21 determines that the application that has transmitted a request does not have a right for the storage 24 (step S75: NO), on the other hand, the process proceeds to step S77.

In the present embodiment, an access policy is determined for each application. By way of example, the access polity is stored in the ROM 22 of the integration ECU 20A. Then, the CPU 21 manages the access policy described above, as the function of the management unit 21A. Each time the CPU 21 receives a request from an application, the CPU 21 determines whether the application has a right for the request based on the access policy, and determines whether the request is permitted.

In step S76, the CPU 21 permits the request transmitted by the application. Then, the right confirmation process is ended.

In step S77, the CPU 21 rejects the request transmitted by the application. Then, the process proceeds to step S78.

In step S78, the CPU 21 notifies the application that the request transmitted by the application has been rejected. Then, the right confirmation process is ended.

Next, an example of the flow of storage 24 access management by the management unit 21A will be described with reference to the sequence diagrams in FIGS. 13 and 14.

Figure 13:
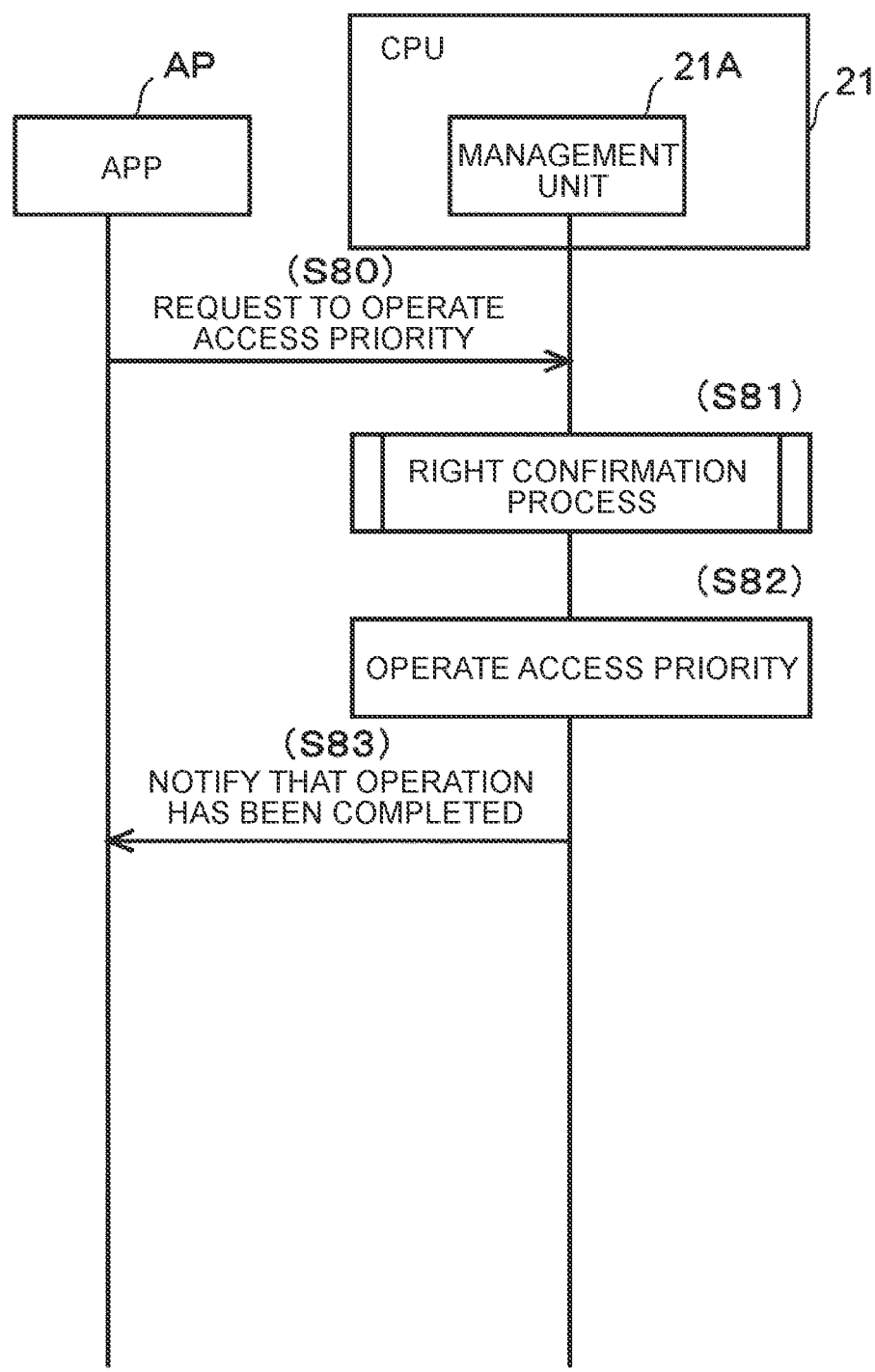
FIG. 13 is a first sequence diagram illustrating an example of the flow of storage access management according to the present embodiment.

FIG. 13 is a first sequence diagram illustrating an example of the flow of storage 24 access management. By way of example, FIG. 13 is a sequence diagram illustrating an example of the flow of a case where a request to operate an access priority is acquired as the access management.

In step S80 in FIG. 13, the CPU 21 acquires a request to operate an access priority from the app AP, as the function of the management unit 21A. By way of example, the request to operate an access priority includes the content of the requested operation for an access priority and an application identifier for identifying the app AP. By way of example, the content of the operation for an access priority includes addition, editing, and deletion of an access priority.

In step S81, the CPU 21 executes a right confirmation process, as the function of the management unit 21A.

In step S82, the CPU 21 operates the access priority of the app AP, from which an operation request has been acquired in step S80, as the function of the management unit 21A.

In step S83, the CPU 21 notifies the app AP that an operation of the access priority has been completed, as the function of the management unit 21A.

Figure 14:
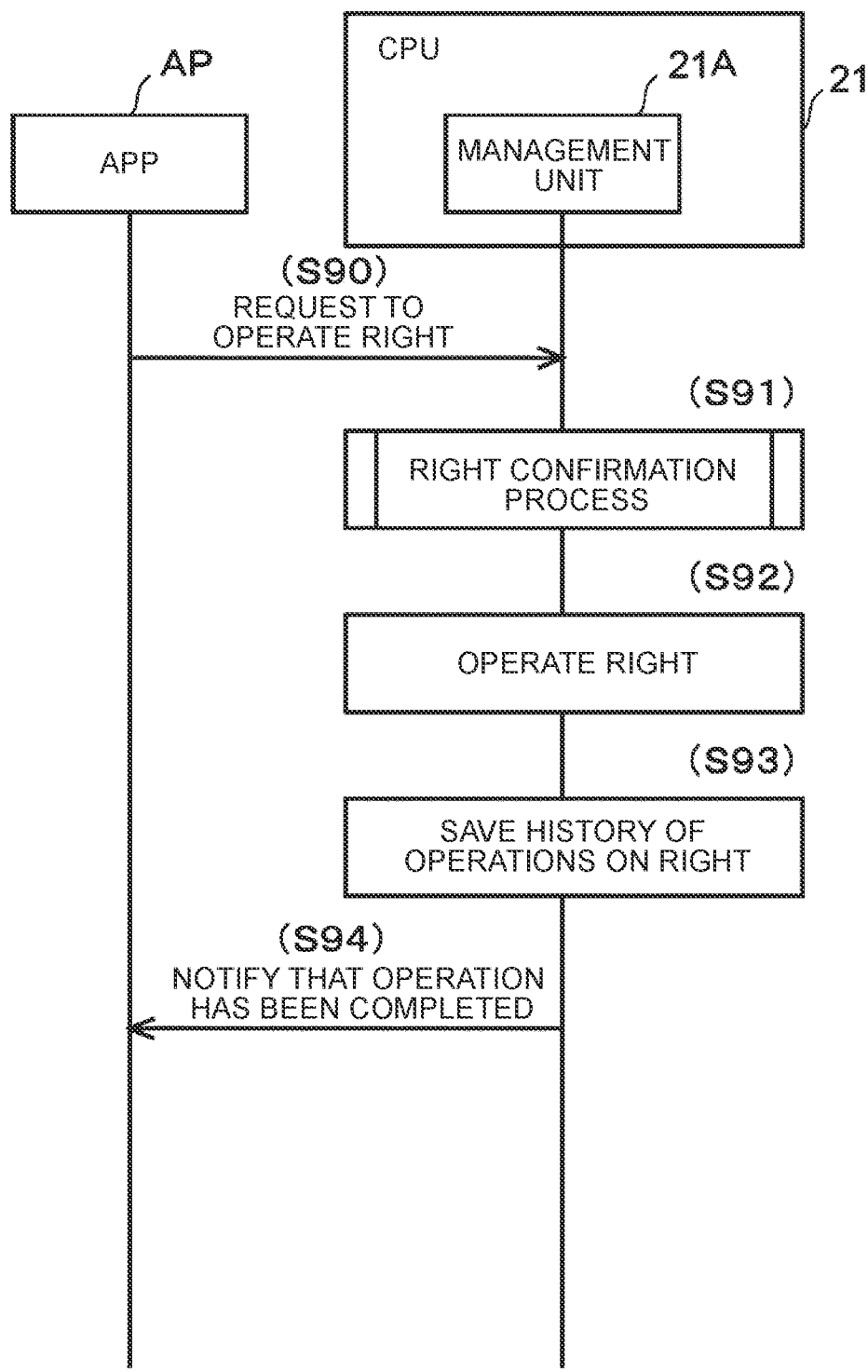
FIG. 14 is a second sequence diagram illustrating an example of the flow of storage access management according to the present embodiment.

FIG. 14 is a second sequence diagram illustrating an example of the flow of storage 24 access management. By way of example, FIG. 14 is a sequence diagram illustrating an example of the flow of a case where a request to operate a right has been acquired as the access management.

In step S90 in FIG. 14, the CPU 21 acquires a request to operate a right from the app AP, as the function of the management unit 21A. By way of example, the request to operate a right includes the content of the requested operation for a right and an application identifier for identifying the app AP. By way of example, the content of the operation for a right includes addition, editing, and deletion of a right.

In step S91, the CPU 21 executes a right confirmation process, as the function of the management unit 21A.

In step S92, the CPU 21 operates the right of the app AP, from which an operation request has been acquired in step S90, as the function of the management unit 21A.

In step S93, the CPU 21 saves a history of operations on the right performed in step S92, as the function of the management unit 21A. The history of operations is saved in the different region 24C of the storage 24, by way of example.

In step S94, the CPU 21 notifies the app AP that an operation of the right has been completed, as the function of the management unit 21A.

In the integration ECU 20A, as described above, the CPU 21 manages allocation of the storage resource to a plurality of applications in the storage region of the storage 24, including the dedicated region 24A and the shared region 24B. Consequently, the CPU 21 allows a plurality of applications to share the storage resource in the shared region 24B, and allows a specific application to exclusively use the storage resource in the dedicated region 24A. Therefore, the CPU 21 allows effective use of the limited storage resource in the storage 24 while always keeping the storage resource available for use for a specific application related to travel performance, for example, by taking the characteristics of the vehicle 10 which requires real-time processing into consideration.

In the integration ECU 20A, the CPU 21 allocates the storage resource in the shared region 24B to the applications after providing a time constraint. Consequently, the CPU 21 can suppress a single application continuously occupying the storage resource in the shared region 24B.

In the integration ECU 20A, the CPU 21 releases the storage resource in the shared region 24B allocated to applications when the time determined by the time constraint has elapsed, and renders the released storage resource available for use for other applications. Consequently, the CPU 21 can allocate the released storage resource in the shared region 24B to other applications.

In the integration ECU 20A, when the storage resource in the shared region 24B allocated to applications is to be released, the CPU 21 temporarily saves the storage resource to be released. In the present embodiment, the storage resource is saved by changing the storage resource attribute of the directory secured as the storage resource in the shared region 24B to a save attribute. Then, a process from the app AP is partially limited for the directory with the storage resource attribute changed to the save attribute as described above, and a writing process from the app AP is prohibited and only a reading process and a deletion process are permitted. Consequently, the CPU 21 does not immediately release the storage resource even when the time determined by the time constraint elapses. Therefore, it is possible to suppress execution of applications being affected immediately after the lapse of the time.

In the integration ECU 20A, the CPU 21 makes an advance announcement to the applications, or notifies the applications, of release of the storage resource in the shared region 24B allocated to the applications. Consequently, the CPU 21 can inform the applications of release of the storage resource in the shared region 24B.

In the integration ECU 20A, the CPU 21 notifies applications of resource information. Consequently, the CPU 21 can inform the applications of the resource information.

In the integration ECU 20A, the CPU 21 manages the access right from a plurality of applications to the storage region of the storage 24. Consequently, the CPU 21 can suppress unauthorized use of the storage region of the storage 24 by the applications.

In the integration ECU 20A, the CPU 21 sets an access priority that determines the degree of priority of access to the storage region of the storage 24 for each of the applications as the access right. Consequently, when a plurality of applications has made an access request for the same region of the storage region of the storage 24, the CPU 21 can give an important application priority to access the region.

In the integration ECU 20A, the CPU 21 changes the proportion of the shared region 24B to the storage region of the storage 24 in accordance with an increase and a decrease in the number of applications. By way of example, when the number of applications is increased and the demand for the storage resource in the storage 24 is increased, the CPU 21 increases the proportion of the shared region 24B to the storage region of the storage 24 to enable allocation of a greater amount of storage resource in the shared region 24B. When the number of applications is decreased and the demand for the storage resource in the storage 24 is decreased, meanwhile, the CPU 21 reduces the proportion of the shared region 24B to the storage region of the storage 24 to reduce the amount of storage resource that can be allocated in the shared region 24B. Consequently, the CPU 21 can adjust the amount of storage resource in the shared region 24B to be allocated to the applications flexibly in accordance with the demand.

In the integration ECU 20A, the CPU 21 sets an upper limit of use of the storage region of the storage 24 for each of the applications. The CPU 21 limits use of the storage region of the storage 24 for an application for which the upper limit of use has been exceeded. In the present embodiment, the available capacity of the storage region of the storage 24 and the upper limit number of times of rewriting of the storage 24 are set as the upper limit of use. The CPU 21 makes setting for at least one of prohibiting a process of writing into the storage region of the storage 24 and functional degradation for an application for which the upper limit of use has been exceeded. The functional degradation includes reducing the frequency of writing per unit time, limiting the time band when writing can be performed, etc., by way of example. Consequently, the CPU 21 can suppress a single application significantly reducing the life of the storage 24.

In the integration ECU 20A, the CPU 21 adjusts the amount of storage resource to be allocated to the applications in accordance with the life of the storage 24. By way of example, when the life of the storage 24 becomes less than an amount determined in advance, the CPU 21 recovers a part of the storage resource allocated to the applications. Consequently, the CPU 21 can adjust the amount of storage resource in the shared region 24B to be allocated to the applications flexibly in accordance with the life of the storage 24.

Others

While the CPU 21 of the integration ECU 20A is used as an example of the "information processing device" in the above embodiment, this is not limiting, and a CPU of a different ECU 20 may be used as an example of the "information processing device". Alternatively, the CPU 21 of the integration ECU 20A and a CPU of a different ECU 20 may be combined with each other to be used as an example of the "information processing device". In this case, at least some of the functional components of the CPU 21 of the integration ECU 20A illustrated in FIG. 4 may be implemented by the CPU of the different ECU 20 in the above embodiment.

In the above embodiment, the shared region 24B is provided in the storage 24 of the integration ECU 20A. However, this is not limiting, and the shared region 24B may be provided in the storage of the different ECU 20, or the shared region 24B may be provided in the storage 24 of the integration ECU 20A and the storage of the different ECU 20. When the shared region 24B is provided in the storage of the different ECU 20, the CPU 21 of the integration ECU 20A manages allocation of the storage resource in the shared region 24B provided in the storage of the different ECU 20, in addition to the storage resource in the shared region 24B provided in the storage 24, for a plurality of applications.

In the above embodiment, the storage resource in the dedicated region 24A is allocated to an application bundled with the vehicle 10 at the time of factory shipping as a specific application among the applications. However, this is not limiting, and the storage resource in the dedicated region 24A may be allocated to an application installed in the vehicle 10 after factory shipping, rather than an application bundled with the vehicle 10 at the time of factory shipping.

In the above embodiment, the storage resource in the dedicated region 24A is allocated to only a specific application among the applications. However, this is not limiting, and the storage resource in the dedicated region 24A may be allocated to all the applications.

In the above embodiment, the storage device that constitutes the storage 24 is an eMMC or a UFS. However, this is not limiting, and an SD card may be added to the storage device that constitutes the storage 24. Consequently, the capacity of the storage region of the storage 24 can be added later. With the capacity of the storage region of the storage 24 added later, the storage resource that can be allocated in the shared region 24B can be increased later.

In the above embodiment, data to be disposed in a cell region (e.g. pseudo Single Level Cell (pSLC) and Triple Level Cell (TLC)) in a single storage device that constitutes the storage 24 may be different in accordance with data properties as the reliability of programs, data, etc.

In the above embodiment, the storage resource includes the capacity and the upper limit number of times of rewriting of the storage 24. Alternatively or additionally, the access speed to the storage 24 may be included in the storage resource.

In the above embodiment, the upper limit number of times of rewriting of the storage 24 allocated as the storage resource to a plurality of applications may be set based on an assumed number of years of operation of the storage 24. The upper limit number of times of rewriting may be set in units of years, months, or days as appropriate.

In the above embodiment, when the release time limit of the storage resource for the application AP arrives, the CPU 21 temporarily saves the directory secured as the storage resource before deleting the directory. However, this is not limiting, and the CPU 21 may temporarily save the storage resource only when the app AP desires to temporarily save the storage resource. In this case, it is desirable to cause the app AP to select whether the storage resource is temporarily saved when the storage resource is allocated to the app AP.

In the above embodiment, the storage resource is saved by changing the storage resource attribute of the directory secured as the storage resource to a save attribute. However, the method of saving the storage resource is not limited thereto. For example, the storage resource may be saved by moving a data file stored by the app AP in the directory secured as the storage resource to the different region 24C. When the data file is moved to the different region 24C, it is desirable that a process from the app AP for the data file should be partially limited, as in the above embodiment. Alternatively, the storage resource may be saved by changing the attribute of a data file stored in the directory secured as the storage resource to a save attribute.

In the above embodiment, the CPU 21 deletes the directory secured as the storage resource in the shared region 24B for the app AP based on the arrival of the release time limit of the storage resource for the app AP. However, this is not limiting, and the CPU 21 may send a notification to the app AP a plurality of times based on the arrival of the release time limit of the storage resource for the app AP, and delete the directory after a certain time elapses since the last notification.

In the above embodiment, resource information to be transmitted to the app AP when a request to acquire resource information is acquired from the app AP may be all of the requested resource information in the storage region of the storage 24, or may be a part of the requested resource information.

In the above embodiment, the number of times of rewriting and the upper limit number of times of rewriting for each cell attribute are acquired as the life of the storage 24 in storage 24 life management. However, this is not limiting, and the range of the rate of use of the life of the entire storage 24 (e.g. XX % or more and less than YY %) may be acquired as the life of the storage 24.

In the above embodiment, the life of the app AP is predicted in storage 24 life management, and the method of predicting the life of the app AP may be changed in accordance with the block size of the storage device that constitutes the storage 24.

Various processors other than the CPU may execute the processes executed by the CPU 21 by reading the software (program) in the above embodiment. The processors in this case include a dedicated electric circuit that is a processor including a circuit configuration exclusively designed for executing a specific process, such as a programmable logic device (PLD) having a circuit configuration that can be changed after the manufacture such as a field-programmable gate array (FPGA), and an application specific integrated circuit (ASIC). The processes may be executed by one of the various processors, or a combination of two or more processors of the same type or different types (e.g. a plurality of FPGAs and a combination of a CPU and an FPGA). The hardware configuration of the various processors is, more specifically, an electric circuit in which circuit elements such as semiconductor elements are combined.

While the information processing program 22A is stored (installed) in advance in the ROM 22 in the above embodiment, this is not limiting. The information processing program 22A may be provided in the form of being stored in a storage medium such as a Compact Disk Read Only Memory (CD-ROM), a Digital Versatile Disk Read Only Memory (DVD-ROM), and a Universal Serial Bus (USB) memory. Alternatively, the information processing program 22A may be downloaded from an external device via the network N.

What is claimed is:

1. An information processing device comprising:
a processor; and
a memory storing instructions executable by the processor,
wherein the processor is configured to:
manage allocation of a resource in a storage region of a storage to a plurality of functions, the storage being mounted on a vehicle, the storage including a dedicated region and a shared region, the dedicated region being configured to be allocated the resource configured to be exclusively used by a specific function, among the functions, the shared region being configured to be allocated the resource configured to be shared by the functions, the resource in the shared region being configured to be dynamically allocated;
manage an access right from the functions to the storage region; and set, as the access right, an access priority that determines a degree of priority of access to the storage region for each of the functions.

2. The information processing device according to claim 1, wherein the processor is configured to allocate the resource in the shared region to the functions after providing a time constraint for which the resource is available for use.

3. The information processing device according to claim 2, wherein the processor is configured to release the resource in the shared region allocated to the functions when a time determined by the time constraint has elapsed.

4. The information processing device according to claim 3, wherein the processor is configured to temporarily save the resource to be released when the resource in the shared region allocated to the functions is to be released.

5. The information processing device according to claim 3, wherein the processor is configured to make an advance announcement to the functions, or notify the functions, of release of the resource in the shared region allocated to the functions.

6. The information processing device according to claim 1, wherein the processor is configured to notify the functions of resource information on the resource in the shared region.

7. The information processing device according to claim 1, wherein the processor is configured to change a proportion of the shared region to the storage region in accordance with an increase and a decrease in the number of the functions.

8. The information processing device according to claim 1, wherein the processor is configured to:
set an upper limit of use of the storage region for each of the functions; and
limit use of the storage region for a function for which the upper limit of use has been exceeded.

9. The information processing device according to claim 1, wherein the processor is configured to adjust an amount of the resource to be allocated to the functions in accordance with a life of the storage.

10. An information processing method that causes a computer to execute a process, comprising:
managing allocation of a resource in a storage region of a storage to a plurality of functions, the storage being mounted on a vehicle, the storage including a dedicated region and a shared region, the dedicated region being configured to be allocated the resource configured to be exclusively used by a specific function, among the functions, the shared region being configured to be allocated the resource configured to be shared by the functions, the resource in the shared region being configured to be dynamically allocated;
managing an access right from the functions to the storage region; and
setting, as the access right, an access priority that determines a degree of priority of access to the storage region for each of the functions.

11. A non-transitory computer-readable storage medium storing instructions that are executable by one or more processors and that cause the one or more processors to:
manage allocation of a resource in a storage region of a storage to a plurality of functions, the storage being mounted on a vehicle, the storage including a dedicated region and a shared region, the dedicated region being configured to be allocated the resource configured to be exclusively used by a specific function, among the functions, the shared region being configured to be allocated the resource configured to be shared by the functions, the resource in the shared region being configured to be dynamically allocated;
manage an access right from the functions to the storage region; and
set, as the access right, an access priority that determines a degree of priority of access to the storage region for each of the functions.

* * * * *